Figure 1:
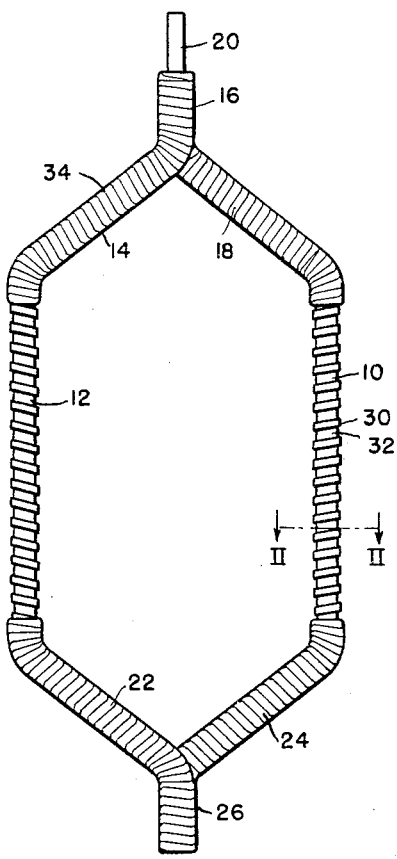

Sept. 18, 1956  S. E. KRISS ET AL  2,763,798
INSULATED ELECTRICAL COILS
Filed May 19, 1953

WITNESSES:

INVENTORS
Sylvester E. Kriss
and Aubrey W. Worthington.
BY
ATTORNEY

United States Patent Office 2,763,798
Patented Sept. 18, 1956

2,763,798
INSULATED ELECTRICAL COILS

Sylvester E. Kriss, Pittsburgh, Pa., and Aubrey W. Worthington, Irving, Tex., assignors to Westinghouse Electric Corporation, East Pittsburgh, Pa., a corporation of Pennsylvania Application May 19, 1953, Serial No. 356,034

6 Claims. (Cl. 310—208)

This invention relates to insulated coils or windings suitable for use in magnetic cores in electrical machines.

In preparing coils or windings to be disposed in slots of magnetic cores of electrical machines, it is desirable that the slot portion be shaped by molding to a fairly precise form and size. The more uniformly and closely to size the slot portions of such coils are made, the easier they will fit into the slots and also a higher space factor will be obtained thereby improving the efficiency of the machine.

In the process of preparing such coils, the practice is to wind a plurality of turns of one or more conductors into a loosely assembled coil and to wrap a rather heavy cloth tape to hold the conductors in the assembled coil form. The slot portion of the assembled coil is then placed in a press comprising pairs of jaws which can be brought together so as to produce a space of rectangular or square cross-section therebetween. In operation, the pairs of jaws are applied about the slot portions of the loosely assembled and taped coil and pressure is applied to squeeze the coils into a rectangular or square bundle. However, it frequently happens that during such compression the cloth tape becomes loosened and portions of the tape are caught between the pairs of approaching jaws whereby a lip is formed at opposite corners of the coil. The lip renders it difficult to insert the slot portion of the coil into an electrical machine. Furthermore, portions of the lip frequently break off during handling thereby exposing the interior of the insulation. Other difficulties arise from the use of conventional cloth tapes on such treated coils.

Inasmuch as only the slot portion of coils can be pressed, the end portions are ordinary poroly compacted and consequently are low in dielectric strength. The use of conventional taping materials, such as cotton tape, on the end portions of the coils does not produce the same dielectric strength characteristics that are present with a lesser amount of insulation at the pressed slot portion.

The object of this invention is to provide a coil wrapped with a flexible tape comprising a solid resinous film.

A further object of this invention is to provide for producing a molded coil having no lips at the molded slot portions thereof.

A still further object of this invention is to provide a coil having end portions tightly wrapped with overlapping plies of a solid resin film tape having high dielectric strength insulation and resin treated molded slot portions also of high dielectric strength.

Figure 2:
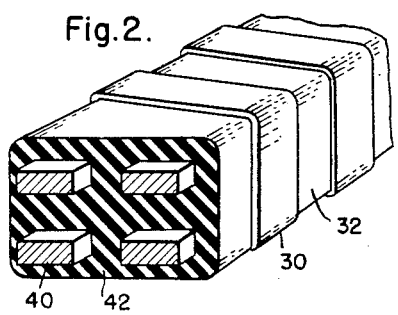

Other objects of the invention will in part be obvious and will in part appear hereinafter. For a better understanding of the nature and objects of the invention, reference should be had to the following description and drawing, wherein:

Figure 1 is a plan view of a full coil produced in accordance with the invention; and Fig. 2 is an enlarged cross section in perspective on line II—II of Fig. 1.

We have discovered that wound coils having molded slot portions can be prepared with complete freedom from lips resulting from improper molding. Furthermore, such coils can be prepared with a high dielectric strength insulation at the end portions thereof without use of excessive thicknesses of various insulating wrapping materials. In accordance with the present invention, coils comprising molded, resin bonded slot portions to enable them to be placed within the cores of electrical machines may be prepared by employing certain solid resinous films of a thickness of the order of from 1 to 3 mils, these films being applied as a tape wrapping in a particular manner below specified to both the slot portions and the end portions of the coils.

Referring to Fig. 1 of the drawing, there is illustrated a full coil comprising two slot portions 10 and 12. At the upper ends of the slot portions are end portions comprising a tangent 14, a loop 16 and another tangent portion 18. A bare lead 20 projects from the loop 16 to enable the coil to be connected to a suitable source of electrical current. From the lower ends of the slot portions, there projects a tangent 22, a second loop 26 and a tangent 24. The coil may be prepared by winding a plurality of turns of one or more conductors on a suitable mandrel or jig until the required number of turns have been assembled and roughly shaped to the full coil shown in Fig. 1. However, these individual turns will be loose. The conductor from which such coil is formed will comprise a metallic conductor such as copper, aluminum or other metal which has been insulated before being wound, with a coating of wire enamel, cotton and resin covering, glass fibers, asbestos fibers, or other conventional wire insulation.

The loose assembled turns of the conductor wound into the full coil are then wrapped with a tape 30 comprising a resilient solid resinous film of high dielectric strength. For the practice of the present invention, we prefer to employ as a tape solid films of a thickness of the order of from 1 to 2 mils, though it will be understood that the maximum tape thickness will vary with the size of the coil. Thus a coil of a cross-sectional dimension of 1½ inches by ½ inch may be wrapped with a tape film of three or four mils thickness. It is necessary that the tape film have considerable strength and resiliency or elasticity.

A particularly suitable tape material is one prepared from solid films of polyethylene glycolterephthalate resins. Such resins may be prepared by reacting a glycol, for instance, ethylene glycol, tetramethylene glycol, or the like, with not over 10 methylene groups per two hydroxyl groups, with terephthalic acid. Such resins and modifications thereof are described in U. S. Patents 2,465,319, 2,597,643, 2,623,031 and 2,623,033. Ribbons or tapes produced from any of these resins may be stretched whereby the resin molecules orient and become extremely strong and flexible. Tapes comprising films of the polyethylene glycol terephthalate polymers of a width of ½ to 1 inch and a thickness of two mils exhibit great strength, and can be broken only with great difficulty by pulling with the bare hands. These tapes will stretch up to 50% and higher before breaking. Their dielectric strength is about 2000 volts per mil thickness.

In the coil of Figure 1, the tape 30 is applied to the slot portions 10 and 12 of the conductor in a single layer with the successive plies separated from one another by a space 32 of substantial width. The tape is stretched and applied fairly tightly, short of the breaking point of the tape. As the tape wrapping reaches the end portions 14—16—18—22—24—26, the plies are lapped over the entire end portions so as to completely cover the end portions. Half-lapped tape wrapping is particularly desirable since this produces an average of two thicknesses of tape over the entire surface of the end portion. It will be understood that the leads 20 are not taped.

The wrapped coil is then impregnated with a resin to fill the spaces between the turns of the conductor forming the coil. Particularly suitable resins are completely reactive, thermosettable resins. Such completely reactive resins may comprise (a) polyesters, which are mixtures or solutions of a vinyl monomer and an unsaturated alkyd resin—a suitable polyester comprising 85 parts by weight of monostyrene and 15 parts by weight of an alkyd prepared from 44 mol percent of adipic acid, 6 mol percent of fumaric acid and 50 mol percent of propylene glycol, (b) reactive olefinic resins, such as diallyl phthalate or mixtures of monostyrene and diphenyl benzene or (c) epoxy resins, such as are produced by reacting one mole of bisphenol with from 1 to 2 moles of epichlorhydrin, as set forth in Patents 2,503,726 and 2,575,558. A thermosetting phenolic varnish may be applied. Other resins are set forth in Patent 2,632,211. Sufficient of the completely reactive resin should be applied to fill the interstices in the fibrous insulation, if any, on the individual conductors and the interstices between conductors.

The impregnated, wrapped conductor is then placed in a hot press for molding the slot portions 10 and 12 to predetermined shape and size. The slot portions are compacted within the press and, upon being heated, the resin present therein will cure to produce a solid insulation at the slot portions. Owing to the tension with which the wrapping 30 was applied, there will be no material loosening of the tape in the molding press during the compacting of the slot portions and consequently no molding lip will be formed. The resulting molded coil will appear much as shown in Figure 1, the slot portions 10 and 12 being thinner and more compact than the end portions.

As shown in Fig. 2 of the drawing, the molded slot portion comprises a plurality of conductors 40 of copper or the like, and a substantially solid void-free insulation 42 comprising a thermoset completely reactive resin embodying the conductors. The tape 30 is shown as projecting above the surface of the insulation 40, but it will be understood that ordinarily the tape 30 will be embedded therein to produce a smooth uniform surface. The natural tension due to the application of the tape 30 will maintain it under some tension even in the molded-product. It will be understood that the resin in insulation 42 will adhere to and bond to the tape 30.

At the less compacted end portions the resin impregnant will penetrate and fill the interstices thereof to a fair degree. The resin in these end portions may be cured in an oven or otherwise converted to a thermoset state. Owing to the tension with which the tape wrapping 34 has been applied, the end portions will be substantially held together though not in as compact form as the slot portions are. The double thickness of the tape 34 on the end portions will improve the dielectric strength of the end portions markedly inasmuch as the solid resinous films will have a dielectric strength of substantial magnitude.

In some cases, the making of coils from a great number of turns of a conductor, as for example, from fifty to one-hundred turns or more, the process may be slightly modified. A number of turns of the conductor are initially wound into a layer, then the thermosettable resin in a viscous or pasty form is brushed or otherwise applied over the slot portions of this layer, then another layer of turns wound, more viscous or pasty resin applied to the slot portions, and this process continued until the entire coil has been wound. The slot portions are thoroughly treated with the viscous resin. Then the entire coil is wrapped tightly with the tape comprising the solid resinous film. However, in this case it is necessary to apply the tape to the slot portion in overlapping fashion to prevent loss of the applied resin as the slot portion is compacted. The coil is then put in a hot press to consolidate the slot portion and to produce a slot portion of the desired shape and size solidly filled with thermoset resin.

In order to provide for the required ground insulation at the slot portion in particular of the molded coils, they are wrapped with a sheet insulating material, such, for example, as mica tape or mica wrapper. Such mica tapes are of a thickness of 5 to 9 mils and one or two thicknesses are adequate for most low voltage machines. The end portions may be wrapped with any suitable ground insulation if such is necessary. For many purposes, the ground insulation is not impregnated with varnish but the coil wrapped therewith is applied to the electrical machine. Subsequent treatment of the machine, such as varnish impregnation, may be employed. For many purposes, the coils with applied ground insulation may be immersed in oil and the ground insulation so treated with oil has an adequate dielectric strength.

Coils produced in accordance with the present invention have been found to be electrically and mechanically superior to coils produced with any previously employed tape, such as cotton tape, glass tape, or the like. Numerous coils prepared in accordance with the present invention have all been free from molded lips or other defects.

It will be understood that while the invention has been particularly described in connection with the closed full coil, other full coils may be prepared in a similar manner. Hairpin coils and half coils may be similarly wrapped and the slot portions thereof molded as described. It will be understood that the above detailed description and drawing are exemplary and not in limitation of the invention.

We claim as our invention:

1. A coil for disposition in a magnetic core of an electrical machine comprising a slot portion to fit within the core, and end portions extending from either end of the slot portion, the coil comprising a plurality of electrical conductors provided with insulation between the conductors, a completely reactive, thermosetting resinous binder applied to the slot portions of the coil, a tape wrapping composed of a solid film of polyethylene glycolterephthalate resin applied to the exterior of the coil, the film being of the order of from 1 to 3 mils in thickness, the slot portion of the molded coil being wrapped with a single layer of the tape, the plies of the tape at the slot portion being spaced apart to enable the thermosetting resinous binder to be applied therethrough to the slot portion of the conductor turns, and plies of the tape being overlapped at the end turns to cover the surface of the end portions completely so as to provide improved dielectric strength thereat, the slot portion of the wrapped coil consolidated under heat and pressure into a substantially solid slot portion, the slot portion being of a predetermined shape and size to better fit the core.

2. The coil of claim 1, wherein the slot portion of the coil is further provided with ground insulation comprising a mica sheet wrapping impregnated with oil.

3. In the process of preparing a coil having slot portions and end portions, the steps comprising, winding a plurality of turns of an insulated conductor into the shape of the coil, the turns being relatively loose, wrapping the entire wound coil with a tape under substantial tension, said tape being composed of a solid resinous film of high dielectric strength, the tape being so wrapped at the slot portions that there is a space between successive plies of the tape, while the plies of tape are wrapped in overlapped relation on the end portions to provide at least one thickness of the tape at every point on the end portion, impregnating the wrapped coil with a thermosettable resin, and hot molding the slot portions only of the impregnated coil in a press in order to press the conductor turns at the slot portion into predetermined size and shape and to cure the resin applied thereto to form a solid slot portion, the end portion not being subjected to pressure, the coil having high dielectric strength at all portions.

4. The process of claim 3, wherein the tape comprises a polyethylene glycol-terephthalate polymer.

5. In the process of preparing a coil having slot portions and end portions, the steps comprising, winding a plurality of turns of an insulated conductor into the shape of the coil, applying a viscous thermosettable resin to the turns of the conductor at the slot portion while winding the coil in order to provide such resin throughout the slot portion of the coil, the assembled turns being relatively loose, wrapping the entire wound coil with a tape under substantial tension, said tape being composed of a solid resinous film of high dielectric strength, the tape being so wrapped that the entire tape is applied in overlapping fashion to retain the applied resin within the slot portion of the coil and to compact the turns of the entire wound coil, and hot molding the slot portions only of the coil to press the conductor turns at the slot portion into a substantially solid unit of predetermined size and shape, and to cure the resin present therein to produce a substantially void-free insulating structure at the slot portion, the entire coil having a high dielectric strength.

6. The process of claim 5, wherein the tape comprises a polyethylene glycol-terephthalate polymer.

References Cited in the file of this patent

UNITED STATES PATENTS

| | | |
|---|---|---|
| 1,306,625 | Priest | June 10, 1919 |
| 1,697,134 | Neely | Jan. 1, 1929 |
| 2,425,294 | Morgan | Aug. 12, 1947 |
| 2,569,540 | Selby | Oct. 2, 1951 |
| 2,601,243 | Botts et al | June 24, 1952 |
| 2,618,728 | Bram | Nov. 18, 1952 |
| 2,623,920 | Ford | Dec. 30, 1952 |

FOREIGN PATENTS

| | | |
|---|---|---|
| 497,254 | Germany | May 5, 1930 |